United States Patent [19]
Bell, Jr. et al.

[11] 3,814,894

[45] June 4, 1974

[54] PULSE GENERATOR AND METHOD FOR ELECTRICAL DISCHARGE MACHINING

[75] Inventors: Oliver A. Bell, Jr., Mooresville; Randall C. Gilleland, Statesville, both of N.C.

[73] Assignee: Colt Industries Operating Corp., New York, N.Y.

[22] Filed: Mar. 22, 1973

[21] Appl. No.: 343,949

[52] U.S. Cl............................. 219/69 C, 219/69 P
[51] Int. Cl............................................. B23k 9/16
[58] Field of Search......................... 219/69 C, 69 P

[56] References Cited
UNITED STATES PATENTS
3,532,850  10/1970  Schulz et al..................... 219/69 C Primary Examiner—E. A. Goldberg
Assistant Examiner—Hugh D. Jaeger
Attorney, Agent, or Firm—Hauke, Gifford, Patalidis & Dumont

[57] ABSTRACT

The pulse generator is operable both in the regular machining mode and in the gap capacitor mode. Included in the generator is a first multivibrator for providing a train of machining power pulses of widely variable and controllable ON-OFF time ratio or duty factor. Also included is a second pulse generator operated in phase with the first but providing pulses of a substantially limited duty factor. During finishing operation in the gap capacitor mode, the pulses from the second multivibrator only are gated to provide operation of the electronic output switch and thus the generation of the machining power pulses. Accordingly, the ON-time is operated with an upper limit during the gap capacitor operating mode.

18 Claims, 1 Drawing Figure

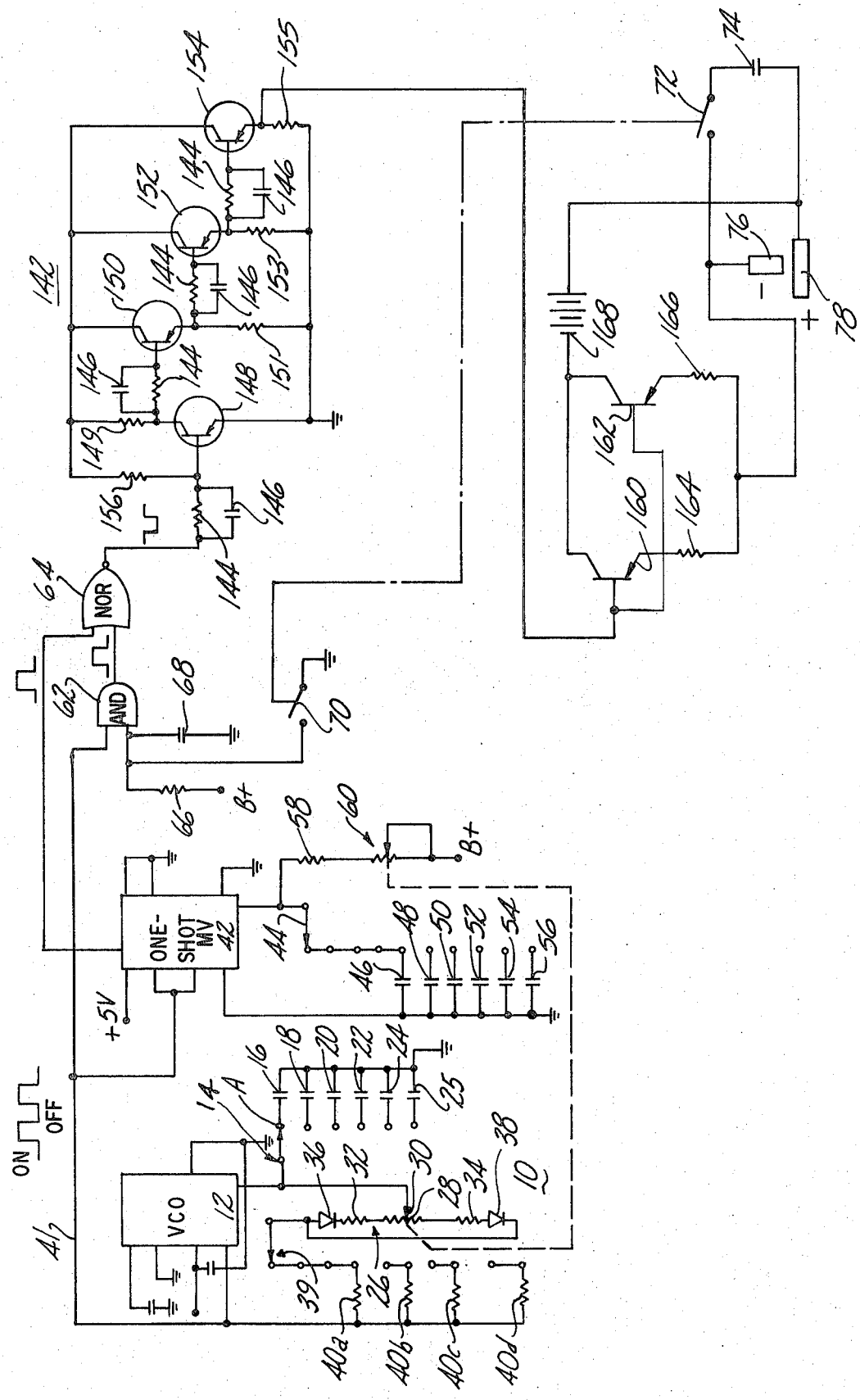

PULSE GENERATOR AND METHOD FOR ELECTRICAL DISCHARGE MACHINING

BACKGROUND OF THE INVENTION

This invention relates to electrical discharge machining, sometimes hereinafter referred to as EDM, which is a process carried on by passing a series or train of discrete localized high current density discharges across a machining gap between a conductive tool electrode and workpiece over a broad range of frequencies.

During the electrical discharge machining process, a dielectric fluid is passed continuously between or through openings in the electrode or workpiece, usually under pressure, to provide both flushing and cooling effect. A servo feed system, generally of the electrohydraulic type, is included to provide relative movement between the electrode and workpiece as the material is removed. A variety of pulse generators have been developed for commercial use in connection with EDM power supplies and it is an essential part of such generators that they be capable of providing selectively variable ON-OFF time pulses at a wide range of available frequencies.

During normal cutting, EDM machining is done by providing square wave pulses to the gap, which pulses cause ionization of the gap with resultant gap dielectric breakdown. This results in removal of the material from the workpiece in discrete particles which are in turn flushed away from the machining gap.

It has been found that "finishing" operation at higher voltages with improved surface finish can be provided by machining in the gap capacitor mode. In this type of operation, a capacitor is connected across the gap and alternately charged and discharged. It is possible to achieve improved finishing results by simply connecting across the gap one of a bank of capacitors and then providing the regular machining power pulses to the gap. Limitations exist with respect to the maximum pulse ON-time that is possible during gap capacitor cutting. It is obvious that with the capacitor charge and discharge times involved an overlapping of pulses and gap DC arcing or shorting could result if the ON-time were too long.

The requirement thus exists for an EDM power supply circuit in which the proper drive signal and a generator for such signal are immediately available on changeover of the circuit between gap capacitor cutting and normal cutting.

SUMMARY OF THE PRESENT INVENTION

The present invention thus will be seen to include a pair of pulse generators; the first being operable in the astable multivibrator mode and the second being a retriggerable one-shot multivibrator operated in phase with the first. Since the one-shot multivibrator is preset to operate with a maximum duty cycle of the order of 30 percent, it can be safely used to provide triggering pulses for the duration of gap capacitor mode cutting. The changeover as between normal and gap capacitor machining is made by actuation of a switch which, at the same time it connects in a gap capacitor, operates to disable the output of the first multivibrator and permits the drive signal to the electronic output switch to be provided only by the shorter ON-time multivibrator. Accordingly, the power supply is one which provides substantially square wave normal EDM operation but makes available rapid changeover to superfinishing and cutting in the gap capacitor mode.

BRIEF DESCRIPTION OF THE DRAWING

The present invention will be described in the accompanying specification and in the drawing, in which there is provided a combined block diagrammatic and schematic showing of the invention.

DETAILED DESCRIPTION OF THE PREFERRED EMBODIMENT

The first of the two pulse generators included in the power supply circuit is indicated generally by the numeral 10 and includes an oscillator 12 which provides at point A a sawtooth voltage waveform output. A capacitor tap switch 14 is included in the circuit to selectively connect one of a plurality of different value capacitors 16–24 in the circuit. The ON-OFF time control part of the pulse generator includes a rheostat 32 having a variable resistor 28 and a movable contact or slider 30. A pair of current limiting resistors 32 and 34 are included in the circuit in series with the resistor 28 and a pair of diodes 36 and 38, respectively. A tap switch 39 is also included for adding into the circuit a selected one of a plurality of different value resistors 40a through 40d. A complete description of the oscillator 12 and of the multivibrator 10 and their mode of operation is given in copending application No. 341,979, filed on Mar. 16, 1973, for "Pulse Generator for Electrical Discharge Machining Power Supply Circuit," which application is of common ownership herewith. This first pulse generator is typically operable over a wide range of duty factor of between one and ninety-nine percent.

The second of the two pulse generators comprises a retriggerable one-shot multivibrator 42 which is coupled to the output of the first pulse generator-multivibrator 10. It will be understood that the oscillator 12 and the one-shot multivibrator 42 may preferably be embodied as integrated circuits currently commercially available. An example of one voltage controlled oscillator suitable for use in connection with the present invention is included in the tone frequency decoder Model SE/SN 567 currently commercially available from Signetics Company of 811 East Arques Avenue, Sunnyvale, Calif. One type of a retriggerable monostable multivibrator or one-shot which is likewise commercially available and suitable for use in the present invention is Model N74122 available from the aforementioned Signetics Company.

In a like manner to the first multivibrator 10, the one-shot multivibrator 42 includes a selectively variable resistor-capacitor network which comprises a tap switch 44 and a plurality of different magnitude capacitors selectively switchable into the circuit to control pulse frequency of the output from the one-shot multivibrator 42. These capacitors are identified by the numbers 46, 48, 50, 52, 54 and 56. At the right side of the resistor-capacitor network, there is included a series resistor 58 and a rheostat 60 for presetting the ON-OFF time of operation of the one-shot 42.

In accordance with the teachings of the present invention, it will be understood that the duty factor of the one-shot multivibrator 42 is suitably limited to a value of the order of 30 percent of the maximum ON-time available. This is done to insure that during the gap capacitor mode of machining there will be provided adequate time for triggering of the output switches 160 and 162 and for charge and discharge of the gap capacitor 74 without resultant DC arcing or gap short circuiting.

The next following stages in the circuit is an AND gate 62 and a NOR gate 64. An external resistor-capacitor network is provided for the AND gate 62 and includes a resistor 66 and a capacitor 68. The output from the first multivibrator 10, including the oscillator 12 with exemplary ON and OFF times indicated, is shown at the upper lead 41 in the drawing. This pulse output is provided as one input to the AND gate 62. A switch 70 is shown with its movable contact in an open position between the lower of the two inputs to the AND gate 62 and ground potential. A second switch 72 is shown connected intermediate a gap capacitor 74 and the gap. The capacitor 74 is connected across the machining gap between the electrode 76 and the workpiece 78 during capacitor mode operation. A broken line is included in the drawing indicating the ganged operation of the switches 70 and 72. It will be understood that this cooperation or conjoint operation between the two switches 70 and 72 which occurs during switching changeover into the gap capacitor mode, could as readily be achieved by including in the circuit a relay arrangement in which the actuation of one switch initiates the closure of another circuit.

With respect to the NOR gate 64, it will be seen that it receives as its two inputs the output from the one-shot multivibrator 42 and the output from the AND gate 62. The detailed mode of operation of the two multivibrators 10 and 42 and of the AND gate 62 and the NOR gate 64 will be given in the section entitled "Description of Operation" hereinafter.

An intermediate drive stage is included in the power supply circuit and is indicated generally by the numeral 142. The drive stage 142 includes an input network including a base resistor 144 and a parallel capacitor 146. Four separate amplifier stages are included in the drive stage 142, with the first stage including a transistor 148 being a common emitter stage, and the next three stages including transistors 150, 152 and 154 all being emitter follower stages. Parallel RC signal networks are also included in the input to each of the latter three stages which include a capacitor 146 and a resistor 144 in similar manner to the input network provided for the transistor 148. Three separate emitter resistors 151, 153 and 155 are included in the circuit as shown in the drawing.

In the first stage, including the transistor 148 and its collector resistor 149, the transistor 148 is biased on by a resistor 156. The signal output from the final emitter follower stage, including the transistor 154, is used to control the operation of a pair of output transistor switches 160 and 162. It can be seen that the output transistor switches 160 and 162 with their respective series resistors 164 and 166 are parallel coupled and connected in series between a main DC power source 168 and the machining gap which as already indicated includes a tool electrode 76 and a workpiece 78 with a plus-minus polarity as shown.

Responsive to the turn-ON and turn-OFF of the output transistor switches 160 and 162, machining power pulses will be furnished to the gap in accordance with each gap breakdown.

DESCRIPTION OF OPERATION

The initial operation of the power supply circuit is begun by the output of the voltage controlled oscillator 12 which has been connected to the preselected one of the capacitors 16–25 through the setting of the switch 14. The voltage $V_a$ is a sawtooth waveform and represents the voltage excursions on the particular capacitors switched in by the setting of the switch 14. In operation, the ON-time is increased by moving the movable contacter or slider 30 of the rheostat 26 downwardly. This increases the portion of the resistor 28 which is in circuit in the charge path for the capacitor 16. At the same time, the resistance of the resistor 28 in series with the resistor 32 and in the discharge path for the capacitor 16 is decreased, thus decreasing the OFF-time. The combined resistance of the resistors 40$a$, 40$b$, 40$c$ or 40$d$, 32 and 34 thus serve to provide a limit to the maximum and minimum ON-OFF time periods. By the adjustment of the rheostat 26 it is possible to inversely vary the machining pulse ON and OFF time without changing the frequency already preset by the capacitor tap switch 14.

The pulse output, as shown at the upper left hand corner of the drawing, on the lead 41 includes an ON-time portion and an OFF-time portion. This waveform is furnished as an input to the upper input terminal of the AND gate 62. An appropriate reference voltage signal is supplied through the resistor 60 to the lower input terminal of the AND gate 62. This input allows the pulse input at the upper input terminal of the AND gate 62 to pass through as an output. The duty cycle of the pulse at the lower input terminal of the NOR gate 64 is always the same or greater than the duty cycle of the pulse input to its upper input terminal. The NOR gate 64 will always pass the longest pulse and provide it as an output in inverted form.

When the operator switches the power supply into the gap capacitor operating mode, the switch 72 is closed to connect the gap capacitor 74 across the gap. It will be understood that there is normally a bank of capacitors provided so that a choice of different magnitude capacitors is available, for example, through an appropriate tap switch arrangement. As has already been indicated, there is a cooperative relationship between the phasing of the switches 70 and 72. As soon as the gap capacitor selecting switch 72 is closed, the switch 70 is likewise closed, thus grounding the lower input terminal of the AND gate 62, thus causing the lower input terminal of the NOR gate 64 to stay at zero. In this condition, the pulse provided at the upper input terminal of the NOR gate 64 is allowed to go through and to be inverted. In this manner, during capacitor mode cutting there is provided a maximum duty factor triggering pulse of the order of 30% which is placed into effect for controlling the maximum conduction period of the output switches 160 and 162.

It will thus be seen that the pulse generator provided in accordance with the teachings of the present invention is one that is particularly useful and advantageous in that the power supply, while it provides wide range variable duty factor square waveform pulses for normal machining, is readily switchable into the gap capicitor mode. The circuit makes provision for automatic reduction of the ON-time of the triggering pulses as soon as the gap capicitor mode has been switched into operation.

What is claimed is:

1. In an electrical discharge machining circuit including a pulse generator having its output connected to an electronic output switch and operable in the regular machining mode for providing electrical discharge machining pulses of relatively wide duty factor range to the machining gap, a system for controlling operation of the power supply circuit in the gap capacitor mode comprising a second pulse generator connected intermediate said first pulse generator and said output switch for providing a relatively limited duration output pulse for triggering said electronic output switch, and a switching means for controlling the connection of at least one gap capacitor across the gap, said switching means effective to connect the output pulses from said second pulse generator to the output electronic switch for the period of capacitor mode operation.

2. The combination as set forth in claim 1 wherein said pulse generators are operable in phase one with the other and at a like frequency.

3. The combination as set forth in claim 1 wherein said first pulse generator comprises an astable multivibrator and wherein said second pulse generator comprises a retriggerable one-shot multivibrator coupled to the output of said first pulse generator and operable in phase therewith.

4. In an electrical discharge machining circuit including a pulse generator having its output connected to an electronic output switch and operable in the regular machining mode for providing electrical discharge machining pulses of relatively wide duty factor range to the machining gap, a system for controlling operation of the power supply circuit in the gap capacitor mode comprising a second pulse generator connected intermediate said first pulse generator and said output switch for providing a relatively limited duration output pulse for triggering said electronic output switch, a switching means for controlling the connection of at least one gap capacitor across the gap, said switching means effective to connect the output pulses from said second pulse generator to the output electronic switch for the period of capacitor mode operation, said first pulse generator comprising an astable multivibrator and said second pulse generator comprising a retriggerable one-shot multivibrator coupled to the output of said first pulse generator and operable in phase therewith, and an AND gate and a NOR gate are coupled successively and between the output of said one-shot multivibrator and the output of said multivibrator and to the control electrode of said output switch, said switching means operable to interrupt the pulse output from said multivibrator and gates to gate only the relatively limited duration pulses to said electronic output switch.

5. The combination as set forth in claim 4 wherein said switching means is coupled to an input to said AND gate for controlling the operation of the following NOR gate to pass and invert the longest pulse being provided respectively from said multivibrator and said one-shot multivibrator during capacitor mode cutting.

6. The combination as set forth in claim 4 wherein said astable multivibrator comprises an oscillator of the voltage controlled type and a resistor-capacitor network coupled to it for operation in a free-running mode.

7. The combination as set forth in claim 5 wherein there is included in said one-shot multivibrator a resistor-capacitor network for controlling its operation and wherein both of said multivibrators include a rheostat, said rheostat gang-operated for controlling the pulse ON-OFF time.

8. A power supply circuit for electrical discharge machining and for triggering an electronic output switch connected to the machining gap including a first free-running pulse generator operable over a wide range of ON-OFF times and frequencies, a second pulse generator operable in phase with the first generator but having a substantially limited duty factor, and a gating means intermediate said generators and said electronic output switch, said gating means being effective to interrupt pulses from said first pulse generator but to continue to pass pulses from said second pulse generator during machining operation in a gap capacitor mode during connection of at least one capacitor across the machining gap.

9. The combination as set forth in claim 8 wherein said gating means is enabled by a switching means, said switching means further operatively connected to said gap capacitor for switching said gap capacitor in parallel circuit with said machining gap.

10. The combination as set forth in claim 8 wherein said first pulse generator includes a voltage controlled oscillator and a selectively adjustable resistor-capacitor network coupled thereto for providing a relatively square wave pulse output.

11. The combination as set forth in claim 10 wherein said second pulse generator comprises a one-shot multivibrator retriggered by the output of said first pulse generator but operable at a duty cycle of approximately 30% of maximum.

12. A power supply circuit for electrical discharge machining and for triggering an electronic output switch connected to the machining gap including a first free-running pulse generator operable over a wide range of ON-OFF times and frequencies, a second pulse generator operable in phase with the first generator but having a substantially limited duty factor, a gating means intermediate said generators and said electronic output switch, said gating means being effective to interrupt pulses from said first pulse generator but to continue to pass pulses from said second pulse generator during machining operation in a gap capacitor mode during connection of at least one capacitor across the machining gap, said first gating means comprising an AND gate coupled to the output of said first pulse generator and having its output coupled to a second NOR gate, said second NOR gate further being coupled to the output of said second pulse generator, and a switching means connected to said AND gate for inhibiting its output responsive to switching of gap capacitors in the circuit.

13. The combination as set forth in claim 12 wherein there is provided a ganged rheostat arrangement for proportionately setting the ON-OFF times of said first and second pulse generators, respectively.

14. The method of electrical discharge machining comprising the steps of:
1. generating a first train of output switch drive pulses of selectively variable ON-OFF time and duty factor;
2. generating a second train of output switch drive pulses of substantially limited duty factor having their leading edges in each case in phase with the corresponding leading edges of said pulses of said first train during normal machining mode;
3. switching at least one gap capacitor across the machining gap to provide finished machining in the gap capacitor mode; and
4. a. simultaneously interrupting said first train of pulses, and
   b. continuing the second pulse train during the gap capacitor machining mode.

15. The combination as set forth in claim 14 wherein said first train of pulses is generated by the operation of an astable multivibrator and wherein said second train of pulses is generated by a retriggerable one-shot multivibrator operated by said first multivibrator.

16. The combination as set forth in claim 14 wherein the pulses of said second train are limited to approximately 30 percent of maximum ON-time available.

17. The combination as set forth in claim 14 wherein steps 4a and 4b are provided by the conjoint operation of a pair of switching means.

18. The combination as set forth in claim 17 wherein a gating means is connected intermediate the respective outputs of said first and second pulse generators and an electronic output switch, said gating means operable to interrupt said first train of pulses responsive to conjoint operation of said switching means.

* * * * *